United States Patent Office 3,506,587
Patented Apr. 14, 1970

3,506,587
PHOTOLUMINESCENT GLASSES
Warren H. Tuner, Toledo, Ohio, and Marvin J. Albinak, Wheeling, W. Va., assignors to Owens-Illinois, Inc., a corporation of Ohio
No Drawing. Continuation-in-part of application Ser. No. 604,642, Dec. 27, 1966. This application Apr. 21, 1967, Ser. No. 632,533
Int. Cl. C09k *1/54, 1/68;* C03c *3/28*
U.S. Cl. 252—301.4                 10 Claims

ABSTRACT OF THE DISCLOSURE

High intensity photoluminescent glasses, comprising aluminosilicates and aluminoborosilicates, containing alkaline earth metal oxides, but being substantially free of alkali metal oxides, and containing a small effective amount of a luminescent activator to convert incident ultraviolet into usable visible illumination, the luminescent activator consisting essentially of at least two members selected from tin oxide, copper oxide, and samarium oxide. The glasses are particularly resistant to devitrification at high temperatures, and are resistant to thermal shock.

---

This invention relates to novel luminescent glass compositions of matter, and especially to photoluminescent glass compositions. Further, this invention relates to glass compositions comprising blends of selected, compatible luminescent activators, that are highly efficient absorbers of ultraviolet rays, and thus, are effective to convert incident ultraviolet into usable visible light.

Further, this invention relates to luminescent glasses that have physical properties capable of incorporation into high intensity area illumination devices, as for street and stadium lighting.

This application is a continuation-in-part of copending application, Ser. No. 604,642 filed Dec. 27, 1966.

Luminescence is describable as photon emission initiated by nonthermal energy forms. In order for a solid to be luminescent under excitation conditions, it must have a suitable arrangement and population of the electronic energy levels in its constituent atoms. With a suitable structural arrangement, properly situated electrons are excited to higher energy levels under the influence of the excitation medium, and these electrons emit photons upon their spontaneous return from the higher energy level form to a lower energy level form.

Luminescent materials, including phosphorescent and fluorescent materials, have found wide acceptance in the art in such uses as fluorescent lights and the like. The luminescent materials emit a radiation, for example, visible radiation, on excitation with such energy forms as ultraviolet light and the like. Thus, they convert these invisible energy forms into visible light forms. Examples of such commercial luminophors are calcium tungstate, copper-activated zinc cadmium selenide, barium-lead sulfate, silver-activated zinc sulfide, various phosphates and miscellaneous tungstates and molybdates.

However, the phosphor materials function somewhat in the nature of reflective coatings, when deposited on a surface of a glass envelope within which ultraviolet rays are generated, as by mercury vapors, for the purpose of producing fluorescence. Therefore, these materials cannot be used to transmit optimum visible light produced as from a mercury vapor street lamp, for example, due to their reflectivity and to their opaque characteristic.

A further problem in the use of phosphors is the tremendous sensitivity to impurities. Minute amounts of impurities cause the luminescence of phosphors to be substantially reduced. Accordingly, phosphors are expensive to produce because of the care and precision required during manufacture, to both remove impurities and to keep impurities out. Expense also arises because of the precautions that must be exercised in keeping impurities out of the phosphor materials during use by the tube manufacturer. The tube manufacturer coats the phosphor material, in the form of a slurry having a liquid carrier therein, onto for example, the inner surface of a glass envelope to produce a luminescent coating. If, at any point during this coating process, impurities are accidentally introduced into the phosphors, the luminescence is greatly reduced.

Also, many prior art luminescent materials (both phosphors and glasses) are very heat-sensitive, often becoming nearly non-luminescent if operated more than a few hundred degrees above the temperature of maximum light output.

Accordingly, it has been a challenge to the art to produce photoluminescent materials displaying practically usable levels of photoluminescent output brightness at elevated temperatures. That is, most luminescent materials which are satisfactory at room temperatures are not satisfactory at elevated temperatures. Thus, in most instances the output is undesirably low and the luminescent materials are not adapted to practical applications such as for general illumination purposes as in street lighting, stadium lighting and the like.

An important development in the lighting of streets, stadiums and the like is the high pressure mercury vapors lamp. While this lamp gives off a relatively large proportion of visible light, it also gives off a very substantial amount of ultraviolet rays. Since the ultraviolet rays are invisible, they are lost and the efficiency of the lamp is quite substantially reduced.

It would therefore provide a substantial advance to the art if these ultraviolet rays could be simultaneously converted into usable visible light so that this normally wasted energy could be effectively utilized.

Thus, if the glass envelope could be made unexpectedly luminescent in order to convert these normally lost ultraviolet rays into visible light, and at the same time be entirely transparent in order to transmit the visible light produced by the unit, a much more efficient lighting device would be provided.

In view of the foregoing discussion, novel luminescent, clear glass compositions of high durability, with unexpectedly bright photoluminescent properties, that would convert incident ultraviolet rays into visible light, would provide a substantial advancement to the art.

Accordingly, it is an important object of this invention to provide novel luminescent glass systems wherein a synergistic combination of photoluminescent activators is utilized in solution in the glassy phase.

A further object is to provide novel luminescent glasses having good physical properties and that are highly efficient converters of incident ultraviolet rays into visible illumination.

A further object is to provide novel luminescent glass systems wherein the output color is controlled from blue to warm white.

A still further object is to provide novel photoluminescent activator systems applicable to a selected spectrum of alkali-free base glass host materials, wherein the activator systems utilize a combination of compounds, so selected that they do not quench one another's characteristic luminescence.

A still further object is to provide novel photoluminescent glass activator systems comprising combination blends of metal oxides and including a selected rare earth oxide.

In accordance with the present invention, novel photoluminescent glass compositions are provided which contain a selected combination of compatible inorganic photoluminescent activators. These novel photoluminescent glass compositions provide maximum utilization of incident ultraviolet and provide the means whereby the color of the luminous output can be controlled. The present invention improves upon the prior art by blending inexpensive metal oxides, and includes the use of small amounts of a selected rare earth metal oxide to provide color balance, and unexpectedly high luminescent output.

More particularly, the present invention provides novel photoluminescent glass compositions having high thermal shock resistance, with a high softening temperature and high resistance to devitrification under high temperature conditions, said compositions consisting essentially of one base glass-forming silicate member containing in solution a small activating amount of a luminescent activator consisting essentially of at least two members selected from tin oxide, copper oxide, and samarium oxide.

Combining activators affords better utilization of the whole ultraviolet spectrum since tin oxide preferentially absorbs (and uses to produce fluorescence) the shorter wave ultraviolet, while copper oxide and particularly samarium oxide utilize the longer wave portions, thus providing maximum efficiency of conversion of ultraviolet to visible light.

Further, the combination of activators provides a system wherein the output color can be controlled from blue to warm white, depending upon the base glass. Thus, tin oxide or tin oxide plus copper oxide will give a luminescent output varying from blue to cold white, depending upon the host material. The samarium oxide, when added, will shift the luminescence toward the pinkish or red end of the spectrum thereby allowing the colors to be warmed to the desired extent for pleasant visual use, by varying the relative concentrations of the other activators.

It is contemplated herein that any suitable glass-forming silicate member may be used providing it has the required properties of high thermal shock resistance (e.g., low coefficient of thermal expansion), high softening temperature, and high resistance to devitrification, all relative to the ambient temperature conditions to which exposed.

Silicate compositions which have been found to be especially suitable in the practice of the invention include the aluminosilicates and borosilicates (including aluminoborosilicates).

In the practice of this invention, it has been found especially suitable to use aluminosilicates containing at least about 8 percent by weight of alumina. In addition, the aluminosilicates may contain compatible ingredients such as zinc oxide and alkaline earth oxides (e.g., MgO).

The aluminosilicate base glasses of the present invention are defined as alkali-free, meaning containing less than about 5 percent by weight of alkali metal oxide. In general, the less alumina in the composition, the less alkali metal oxide which can be tolerated if the composition is to have the required physical properties. It is therefore contemplated that the composition should contain at least one molecule of alumina for each molecule of alkali metal oxide.

The borosilicates suitable for the practice of the invention typically contain at least 5 percent by weight of $B_2O_3$. In addition, as used herein, the borosilicates include the aluminoborosilicates. The borosilicates may also contain other compatible ingredients, e.g., as defined hereinbefore for the aluminosilicates.

Representative glass-forming silicate compositions are illustrated not by way of limitation in Table I hereinafter.

TABLE I.—PERCENT BY WEIGHT

| Borosilicates | | | | | | |
|---|---|---|---|---|---|---|
| $SiO_2$ | $Al_2O_3$ | $B_2O_3$ | $Na_2O$ | $K_2O$ | CaO | MgO |
| 80.5 | 2.2 | 12.9 | 3.8 | 0.4 | | |
| [1] 70.0 | 1.1 | 28.0 | | 0.5 | | |
| 67.3 | 1.7 | 24.6 | 4.6 | 1.0 | | 0.2 |
| 80.4 | 2.5 | 13.0 | 4.3 | | | |
| Aluminosilicate | | | | | | |
| 57.0 | 20.5 | 4.0 | 1.0 | | 5.5 | 12.0 |
| 61.1 | 18.5 | | | | | 20.5 |
| [2] 58.0 | 17.6 | | | | | 19.4 |
| [3] 65.0 | 9.2 | | 11.2 | | | |
| Aluminoborosilicate | | | | | | |
| [4] 74.7 | 5.6 | 9.6 | 6.4 | 0.5 | 0.9 | |

[1] Also contains 1.2% PbO.
[2] Also contains 5.0% $Li_2O$.
[3] Also contains 14.7% ZnO.
[4] Also contains 2.2% BaO.

In a further embodiment of this invention, it is contemplated using base glasses which do not have the specific aforementioned thermal resistance properties. These are applicable to use in lower temperature environments.

In accordance with such embodiment, these base glasses contain, in solution, a small effective amount of the aforementioned inorganic photoluminescent activator, e.g., tin oxide in combination with at least one member selected from copper oxide and samarium oxide; and the combination of copper oxide and samarium oxide per se.

Typical glass-forming compositions contemplated in the practice of the aforementioned second embodiment include not by way of limitation, alkali free Cabal glasses and zinc aluminoborate glasses.

Representative compositions containing inorganic activator are illustrated not by way of limitation in Table II. Each composition contained about 0.65 percent inorganic activator. All figures are percent by weight.

TABLE II

| Cabal | | $ZnO$—$Al_2O_3$—$B_2O_3$ | |
|---|---|---|---|
| $Al_2O_3$ | 14.88 | $Al_2O_3$ | 11.79 |
| CaO | 29.61 | ZnO | 55.90 |
| $B_2O_3$ | 54.86 | $B_2O_3$ | 31.96 |

In accordance with the invention, the inorganic activators are incorporated with the glass-forming member in an amount sufficient to provide a resulting luminescent glass which will convert incident ultraviolet rays into usable, visible light.

Typically, the tin oxide is incorporated with the base glass or host member in an amount ranging from about .1 to about 1 percent by weight, based on the weight of the host material.

The samarium oxide is typically incorporated in an amount ranging from about .1 to about 5 percent by weight, based on the weight of the host glass-forming material.

The copper oxide is typically incorporated in an amount ranging from about .1 to about 1 percent by weight, based on the weight of host material.

When tin oxide and copper oxide are used in combination, the total preferably does not exceed about 1.5 percent by weight, based on the weight of the host material. In any event, it is contemplated that the total weight of the inorganic activators should not exceed about 10 percent by weight, and preferably less than 7 percent by weight, based on the weight of the host material.

The following examples represent photoluminescent glass compositions prepared in accordance with this invention. These compositions represent some of the best modes contemplated by the inventors in the practice of the invention.

EXAMPLE I.—ALUMINOSILICATE GLASS

The base glass used in this run was a magnesia-alumina-silica glass of the following typical composition. This is operable in accordance with the principles of the present invention, as indicated hereinbefore.

| Glass | | Range of additives (percent) | | |
|---|---|---|---|---|
| Ingredient | Percent | CuO | SnO | $Sm_2O_3$ |
| $SiO_2$ | 60.90 | .05 | .10 | |
| $Al_2O_3$ | 18.47 | | | |
| MgO | 20.48 | | | |

EXAMPLE II.—ALUMINOSILICATE GLASS

The base glass used in this run with a lithia-magnesia-alumina-silica glass of the following composition. This is operable in accordance with the principles of the present invention as indicated hereinbefore.

| Glass | | Range of additives (percent) | | |
|---|---|---|---|---|
| Ingredient | Percent | CuO | SnO | $Sm_2O_3$ |
| $SiO_2$ | 57.67 | .25 | .25 | |
| $Al_2O_3$ | 17.48 | | | |
| MgO | 19.37 | | | |
| $Li_2O$ | 4.98 | | | |

EXAMPLE III.—BOROSILICATE GLASS

The base glass used in this run was a borosilicate glass of the following composition. This is operable in accordance with the principles of the invention as indicated hereinbefore.

| Glass | | Range of additives (percent) | | |
|---|---|---|---|---|
| Ingredient | Percent | CuO | SnO | $Sm_2O_3$ |
| $SiO_2$ | 79.65 | .10 | .50 | .15 |
| $Al_2O_3$ | 2.48 | | | |
| $Na_2O$ | 4.22 | | | |
| $B_2O_3$ | 12.90 | | | |

EXAMPLE IV.—ZINC CONTAINING ALUMINOSILICATE

The base glass used in this series of runs was a zinc glass of the following composition. This is operable in accordance with the principles of the present invention within the ranges indicated hereinbefore.

| Glass | | Range of additives (percent) | | |
|---|---|---|---|---|
| Ingredient | Percent | CuO | SnO | $Sm_2O_3$ |
| $SiO_2$ | 64.65 | .02–.40 | .04–.40 | 0–.25 |
| $Al_2O_3$ | 9.14 | | | |
| ZnO | 14.60 | | | |
| $Na_2O$ | 11.11 | | | |

As noted hereinbefore, the compositions prepared in accordance with the examples exhibit good transparency, strong brilliant luminescence, high resistance to devitrification and high thermal shock resistance. In addition, the glasses are highly efficient at elevated temperatures in the conversion of incident ultraviolet radiation into visible illumination. Accordingly, such compositions are highly suitable for the manufacture of a mercury vapor lamp glass envelope which is to be subjected to the high temperature environment of the lamp.

Glasses containing luminescent agents have been disclosed in the prior art. For example, see U.S. Letters Patents 2,097,275 and 2,099,602 issued to Fischer.

These patents contain a dissertation on the preparation of luminescent glasses containing low amounts of iron and lead (which tend to quench luminescent activators). In addition, the patents disclose that the alkaline earth metal oxides, particularly magnesium oxide, reduce the light emitted from a discharge receptable by reducing the luminescence of the glass wall, and that the luminescence is even further reduced by the addition of calcium oxide or aluminum oxide, or by the addition of both of these substances.

Copper has also been described by these patents as producing an intense afterglow, meaning an extended half life. Thus, copper has been disclosed as being used in very small amount in order to minimize afterglow.

In the Fischer patents, particularly U.S. Letters Patent 2,097,275, several metals are disclosed as separate luminescent activators for low iron glass. Thus, copper, tin and samarium are disclosed as separate activators. Tin oxide and copper oxide are also disclosed in combination in low iron, high alkali glasses, typified by soft tubing glasses of the earlier art. In addition, other oxide additives are disclosed as inorganic activators for imparting luminescence to glass. However, nowhere do the Letters Patent to Fischer disclose the present invention.

Furthermore, the Letter Patent to Fischer do not disclose that the combinations of the present invention would unexpectedly provide novel glasses for converting otherwise waste radiation into visible light. Accordingly, it is clear that the prior art, e.g., as represented by the Fischer patents, has not recognized the unexpected novelty of combining the specific additives into the specific glasses set forth by the present invention.

We claim:

1. As a glass composition of matter, an aluminosilicate having less than 5% by weight of alkali metal oxide and containing, in solution, a sufficient amount of a luminescent activator consisting essentially of at least two members selected from tin oxide, copper oxide, and samarium oxide to render the composition luminescent.

2. The composition of claim 1, wherein the luminescent activator comprises tin oxide, present in an amount ranging from about .1 to about 1 weight percent, and the other selected activating member is copper oxide in an amount ranging from about .1 to about 1 weight percent, based on the weight of the host silicate member.

3. The composition of claim 2, wherein the total amount of tin oxide and copper oxide does not exceed about 1.5 percent by weight, based on the weight of the host silicate member.

4. The composition of claim 2, wherein there is also present samarium oxide in an amount ranging from about .1 to about 5 percent by weight, based on the weight of the host silicate material.

5. The composition of claim 1, wherein the luminescent activator comprises copper oxide, present in an amount ranging from about .1 to about 1 weight percent, and the other selected activator member is samarium oxide in an amount ranging from about .1 to about 5 weight percent, based on the weight of the host silicate member.

6. The composition of claim 1, wherein the aluminosilicate is an alkaline earth metal oxide-containing aluminosilicate.

7. The composition of claim 6, wherein the luminescent activator comprises tin oxide, present in an amount ranging from about .1 to about 1 weight percent, and the other selected activating member is copper oxide in an amount ranging from about .1 to about 1 weight percent, based on the weight of the host silicate member.

8. The composition of claim 7, wherein the total amount of tin oxide and copper oxide does not exceed about 1.5 percent by weight, based on the weight of the host silicate member.

9. The composition of claim 6, wherein there is also present samarium oxide in an amount ranging from about .1 to about 5 percent by weight, based on the weight of the host silicate material.

10. The composition of claim 6, wherein the luminescent activator comprises copper oxide, present in an amount ranging from about .1 to about 1 weight percent, and the other selected activator member is samarium oxide in an amount ranging from about .1 to about 5 weight percent, based on the weight of the host silicate member.

References Cited

UNITED STATES PATENTS

| | | | |
|---|---|---|---|
| 2,049,765 | 8/1936 | Fischer | 252—301.4 |
| 2,097,275 | 10/1937 | Fischer | 252—301.4 |
| 2,099,602 | 11/1937 | Fischer | 252—301.4 |

HELEN M. McCARTHY, Primary Examiner

R. D. EDMONDS, Assistant Examiner

U.S. Cl. X.R.

106—52, 54